United States Patent

Newsome

[15] 3,641,614
[45] Feb. 15, 1972

[54] WINDSHIELD WIPER ASSEMBLIES

[72] Inventor: Alfred Anthony Newsome, 250 Montmorency Drive, Hamilton, Ontario, Canada

[22] Filed: Mar. 16, 1970

[21] Appl. No.: 19,861

[52] U.S. Cl. ............................................. 15/250.32, 287/93
[51] Int. Cl. .............................................................. B60s 1/40
[58] Field of Search ................... 15/250.35, 250.42, 250.32; 287/93

[56] References Cited

UNITED STATES PATENTS 3,378,874   4/1968   Scinta ............................. 15/250.42 X

FOREIGN PATENTS OR APPLICATIONS 44,399   7/1956   Germany ............................. 15/250.32
867,075   5/1961   Great Britain ......................... 287/93

*Primary Examiner*—Peter Feldman
*Attorney*—Church and Rogers

[57] ABSTRACT

A windshield wiper clip assembly for attaching a windshield wiper to a wiper arm, particularly for a wiper/arm, combination of side pin mounting type. The clip body has a transverse bore for the reception of the wiper arm pin, the pin having an intermediate portion of reduced diameter to provide two spaced parallel radially extending shoulders; a clip member which preferably is pivoted to the clip body embraces the clip body in a retaining position and has a part which extends into the body and engages the pin shoulders to retain the pin in the bore. The clip member preferably is of U-shape with two parallel sidewalls embracing the clip body and slotted to be a snap fit on the portions of the pin protruding from the clip body.

2 Claims, 4 Drawing Figures

PATENTED FEB 15 1972
3,641,614
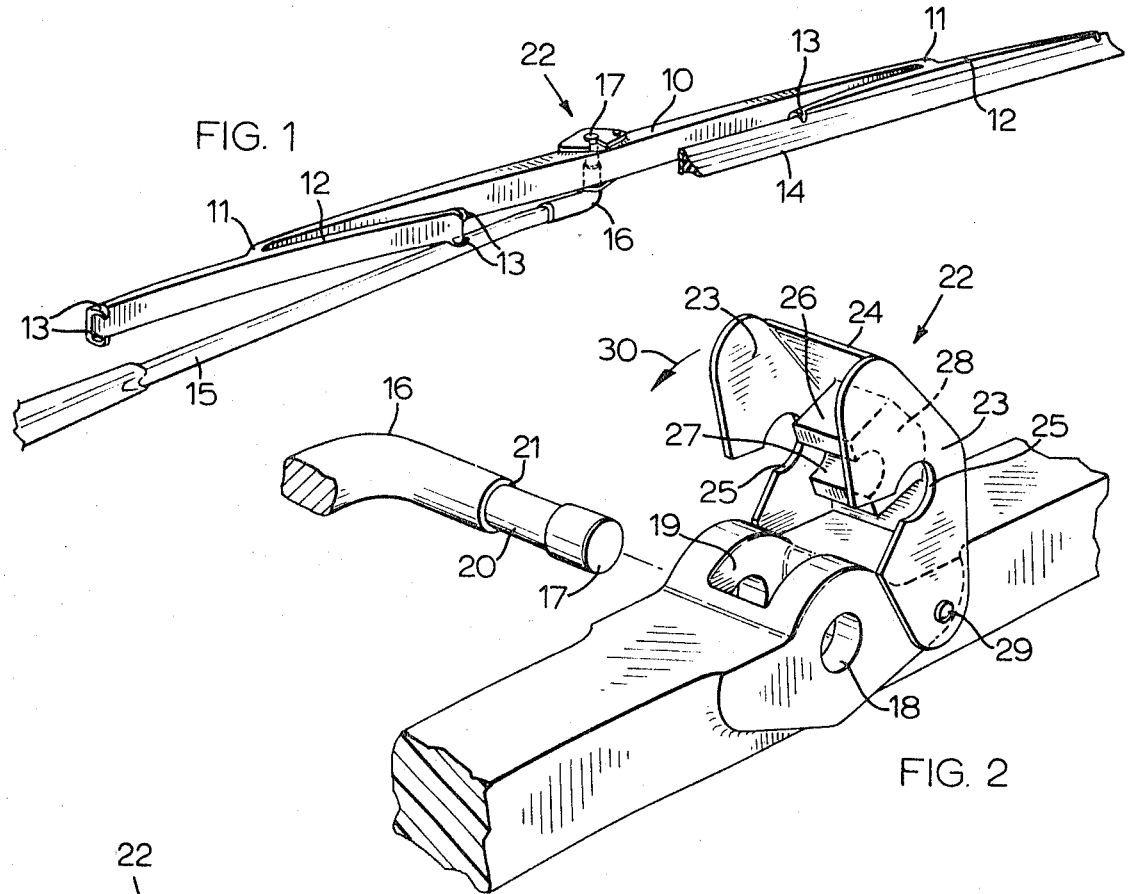
FIG. 1
FIG. 2
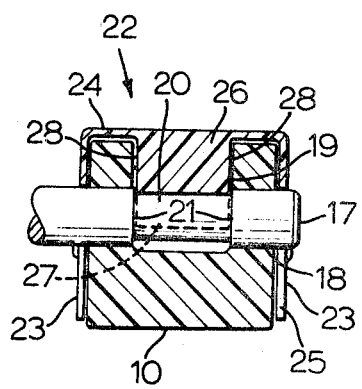
FIG. 4
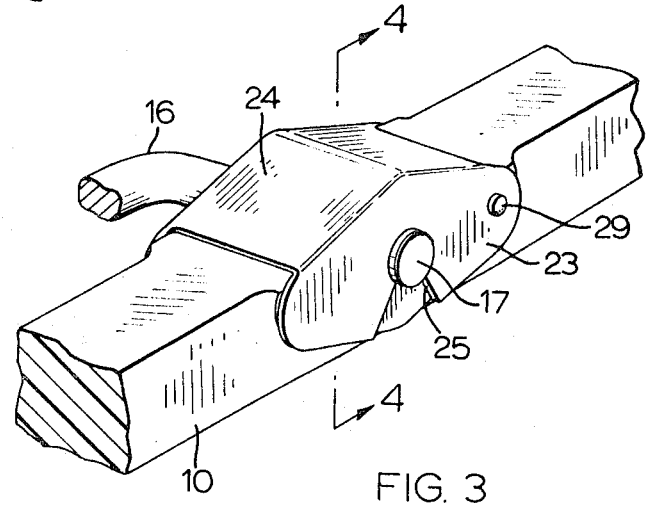
FIG. 3
INVENTOR.
ALFRED ANTHONY NEWSOME
BY Church & Rogers
PATENT AGENTS

WINDSHIELD WIPER ASSEMBLIES

FIELD OF THE INVENTION

This invention relates to improvements in windshield wiper clip assemblies employed for connecting a windshield wiper to a wiper arm.

SUMMARY OF THE INVENTION

The principal object of the invention is to provide a new clip assembly of simple and inexpensive form especially suited for manufacture as a plastic moulding.

It is another object to provide such an assembly especially adapted for manufacture in conjunction with a windshield wiper produced by moulding from plastic material.

It is a further object of the invention to provide such a windshield wiper clip assembly which is particularly adapted for use in conjunction with an arm and wiper combination of the side pin mounting type, such a combination being employed when it is desired to provide a low silhouette and to permit the wiper in parked position to be concealed in a slot in the vehicle cowl.

In accordance with the present invention there is provided a windshield wiper clip assembly for the detachable attachment of a windshield wiper to a wiper arm, the assembly comprising a clip body, a transverse bore in the body for the reception therein of a wiper arm pin upon which the clip body can pivot about a corresponding axis, the pin having an intermediate portion of reduced diameter to provide corresponding radially extending shoulders, an opening in the clip body extending around at least the said reduced diameter portion of a pin engaged in the transverse bore to expose the portion, and a clip member pivoted to the clip body for movement between a retaining position and a releasing position, the clip member being adapted to embrace the clip body in the said retaining position, having a portion thereof that extends into the aperture when embracing the body and is in engagement with the pin shoulders to prevent axial movement of the pin out of the bore, and having two parallel sidewalls engaging corresponding walls of the clip body and slotted to be a snap fit on the corresponding portion of the pin protruding from the clip body.

DESCRIPTION OF THE DRAWINGS

A particular preferred embodiment of the invention will now be described, by way of example, with reference to the accompanying drawing, wherein FIG. 1 is a general perspective view showing a windshield wiper and arm combination of the side pin mounting type, FIG. 2 is a perspective view to a larger scale of the center portion of the combination of the FIG. 1, showing the wiper arm pin member ready for insertion in the clip assembly body, and the clip member of the assembly in its retracted releasing position, FIG. 3 is a view similar to FIG. 2, but showing the pin inserted in the assembly body and the clip member in its engaged retaining position, and FIG. 4 is a section taken on the line 4—4 of FIG. 3.

DESCRIPTION OF THE PREFERRED EMBODIMENTS

The combination of windshield wiper and arm illustrated herein is of the so-called side pin mounting type. The windshield wiper comprises a wiper superstructure constituted by an elongated backing member 10 connected by junctions 11 to subsidiary yoke arms 12, each yoke arm being provided at its ends with opposed pairs of claws 13 which embrace and retain a windshield wiper squeegee assembly 14. The main backing member 10, the junctions 11 and the subsidiary members 12 are formed integrally with one another by means of a single moulding operation, and for further detail of the design and construction of such as windshield wiper reference may be made to our U.S. Pat. No. 3,176,337.

The wiper is supported for movement to-and-fro across the surface of a windshield by means of an arm 15, which is connected to the usual drive mechanism; such mechanism does not form part of the present invention and therefore is not illustrated herein. The free end of the wiper arm is provided with an end member 16 whose free end is turned approximately at right angles to the remainder of the member and the arm and carries a projecting circular cross section pivot pin 17. This pin is insertable with minimum play in a bore 18 in the backing member 10, this bore being located approximately centrally of the length of the backing member. The bore is also located approximately centrally with regard to the height of the backing member, which is of increased thickness at this point to provide the necessary strength and security.

The face of the backing member which is in operation further from the windshield is provided with a central opening 19 which is of approximately rectangular shape as seen from above. This opening 19 intersects the bore 18 and divides it into two separate portions each located in a respective backing member sidewall. The wiper arm pin 17 is provided with a portion 20 of reduced diameter, of an axial length which is equal to the corresponding width of the said opening 19, so that the radially extending shoulders 21 formed by the reduced portion 21 register with the inner side walls of the opening (see FIG. 4).

The wiper clip assembly also comprises a clip member 22, which cooperates with the central portion of the backing member to retain the pin 17 in the bore 18, the clip member being of generally U-shape having substantially flat parallel sidewalls 23 and a connecting portion 24. The sidewalls are spaced apart a distance such that the clip member snugly embraces the sidewalls of the central portion of the backing member, while the connecting portion fits closely over the top thereof. Each sidewall is provided with a keyhole shaped slot 25 so dimensioned that it is a snap fit over the portions of the pin 17 protruding from the hole 18 on either side of the backing member. A clip-retaining block 26 extends from the underside of the clip-connecting portion, and has an aperture 27 therein so dimensioned that, when the clip member is in the operative retaining position shown in FIGS. 3 and 4, the block is a close fit on the pin portion 20 of reduced diameter; the block can instead be a snap fit on the pin portion 20. The block also provides shoulders 28 which engage the cooperating shoulders 21 of the pin and prevent axial movement of the pin out of the bore 18.

In this particular embodiment the clip member 22 is permanently pivotally retained on the backing member by having one end thereof forced over pin projections 29 moulded with the backing member until the projections are engaged in cooperating apertures provided in the member.

It will be seen that the mounting of the windshield wiper on the arm is extremely simple and effective in that it is only necessary to pull back the clip member on its pivots to the position shown in FIG. 2, and then to insert the wiper arm pin 1 into the bore 18. Thereafter, the clip member 22 is swung down as indicated by the arrow 30, to the position shown in FIGS. 3 and 4, when the keyhole-shaped slots 25 in the clip sidewalls 23 have snapped onto the pin 17. Removal of the windshield wiper from the arm is equally simple, in that any flat object, such as a coin or even a finger nail, can be engaged beneath the clip member and used to disengage it from the pin, so that thereafter the pin can easily be disengaged from the backing member by axial movement in the bore 18. It will be seen that the clip assembly is effective if any one, or any two, or all of the block 26 and the two sidewalls 23 are a snap fit on the pin 17.

The embodiments of the invention in which an exclusive property or privilege is claimed are defined as follows:

1. A windshield wiper clip assembly for the detachable attachment of a windshield wiper to a wiper arm, the assembly comprising a clip body, a transverse bore in the body for the reception therein of a wiper arm pin upon which the clip body can pivot about a corresponding axis, the pin having an intermediate portion of reduced diameter to provide corresponding radially extending shoulders, an opening in the clip body extending around at least the said reduced diameter portion of a pin engaged in the transverse bore to expose the portion, and a clip member pivoted to the clip body for movement between a retaining position and a releasing position, the clip member being adapted to embrace the clip body in the said retaining position, having a portion thereof that extends into the aperture when embracing the body and is in engagement with the pin shoulders to prevent axial movement of the pin out of the bore, and having two parallel sidewalls engaging corresponding walls of the clip body and slotted to be a snap fit on the corresponding portion of the pin protruding from the clip body.

2. An assembly as claimed in claim 1, wherein the said clip body is an integral portion of a backing member of a windshield wiper superstructure.

* * * * *